(12) United States Patent
Liu et al.

(10) Patent No.: US 11,101,886 B1
(45) Date of Patent: Aug. 24, 2021

(54) OPTICAL NETWORK DEVICE WITH ABNORMAL LIGHT EMISSION DETECTION

(71) Applicant: REALTEK SEMICONDUCTOR CORP., Hsinchu (TW)

(72) Inventors: Juan Liu, Hsinchu (TW); Lian Cheng, Hsinchu (TW); Hua-Zhen Tian, Hsinchu (TW); Jun Mao, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/930,053

(22) Filed: Jul. 15, 2020

(30) Foreign Application Priority Data

Feb. 24, 2020 (CN) .......................... 202010111286.6

(51) Int. Cl.
*H04B 10/079* (2013.01)
*H04B 10/40* (2013.01)

(52) U.S. Cl.
CPC ........... *H04B 10/079* (2013.01); *H04B 10/40* (2013.01)

(58) Field of Classification Search
CPC .............................. H04B 10/079; H04B 10/40
USPC ........................................................... 398/22
See application file for complete search history.

(56) References Cited

U.S. PATENT DOCUMENTS

| | | | | |
|---|---|---|---|---|
| 2007/0143645 A1* | 6/2007 | Haran | ............... | H04B 10/07955 714/704 |
| 2007/0147836 A1* | 6/2007 | Dong | ................. | H04Q 11/0067 398/71 |
| 2008/0044177 A1* | 2/2008 | Huang | ................... | H04J 3/1694 398/15 |
| 2008/0044185 A1* | 2/2008 | Lee | ......................... | H04J 3/1694 398/98 |
| 2010/0098413 A1* | 4/2010 | Li | .......................... | H04B 10/07 398/38 |
| 2011/0033180 A1* | 2/2011 | Smith | .................. | H04B 10/272 398/1 |
| 2012/0177361 A1* | 7/2012 | Hirano | ............... | H04Q 11/0067 398/1 |
| 2014/0029947 A1* | 1/2014 | Wan | ..................... | H04B 10/272 398/67 |

(Continued)

FOREIGN PATENT DOCUMENTS

| | | |
|---|---|---|
| CN | 101710847 A | 5/2010 |
| CN | 102142897 A | 8/2011 |

(Continued)

*Primary Examiner* — Dalzid E Singh
(74) *Attorney, Agent, or Firm* — Birch, Stewart, Kolasch & Birch, LLP

(57) ABSTRACT

An optical network device with abnormal light emission detection includes an optical transceiver circuit and a control circuit. The optical transceiver circuit receives a transmission signal. The control circuit enables the optical transceiver circuit according to the transmission signal, so that the optical transceiver circuit outputs an optical signal. The optical transceiver circuit outputs a status signal according to whether or not the optical transceiver circuit outputs the optical signal. The status signal triggers an interrupt system of the control circuit. The interrupt system is provided with a counter to count a light emission duration of the optical transceiver circuit. When the light emission duration is greater than a preset value, the control circuit stops the optical transceiver circuit from outputting the optical signal.

19 Claims, 5 Drawing Sheets

(56) References Cited

U.S. PATENT DOCUMENTS

2014/0369676 A1* 12/2014 Hamaoka ............ H04L 12/2885
398/25

FOREIGN PATENT DOCUMENTS

| CN | 102916742 A | 2/2013 |
| CN | 105227234 A | 1/2016 |
| CN | 104904140 B | 4/2017 |
| CN | 109547100 A | 3/2019 |
| TW | 201705700 A | 2/2017 |

* cited by examiner

OPTICAL NETWORK DEVICE WITH ABNORMAL LIGHT EMISSION DETECTION

CROSS-REFERENCE TO RELATED APPLICATION

This non-provisional application claims priority under 35 U.S.C. § 119(a) to Patent Application No. 202010111286.6 filed in China, P.R.C. on Feb. 24, 2020, the entire contents of which are hereby incorporated by reference.

BACKGROUND

Technical Field

The present invention relates to an optical network device, and in particular, to an optical network device with abnormal light emission detection.

Related Art

A passive optical network (PON) is an optical fiber communication network consisting of an optics line terminal (OLT), an optics network unit (ONU), and an optics distribution network (ODN). The passive optical network is characterized by point-to-multipoint communication transmission. General communication transmission is divided into uplink transmission and downlink transmission. In the passive optical network, the downlink transmission represents that the optics line terminal constantly transmits data to a plurality of optics network units, and the uplink transmission represents that the plurality of optics network units transmit the data to the optics line terminal. Each optics network unit can only transmit the data in a time slot allocated by the optics line terminal, so that the plurality of optics network units and one optics line terminal can normally transmit the data.

According to an operation mode of the foregoing passive optical network, when a time point at which one of the optics network units emits light abnormally falls in a time slot allocated by other optics network units, it will affect the communication transmission of the entire optics network unit.

SUMMARY

In view of the foregoing, the present invention provides an optical network device with abnormal light emission detection, which is applicable to detecting a light emission abnormality of an optics network unit.

According to some embodiments, the optical network device with abnormal light emission detection includes an optical transceiver circuit and a control circuit. The optical transceiver circuit receives a transmission signal. The control circuit enables the optical transceiver circuit according to the transmission signal, so that the optical transceiver circuit outputs an optical signal. The optical transceiver circuit outputs a status signal according to whether or not the optical transceiver circuit outputs the optical signal, and the control circuit accumulates a light emission duration according to the status signal. When the light emission duration is greater than a preset value, the control circuit stops the optical transceiver circuit from outputting the optical signal.

According to some embodiments, when the status signal is converted from a non-light emission status to a light emission status, the control circuit starts to accumulate the light emission duration. When the status signal is converted from the light emission status to the non-light emission status, the control circuit stops accumulating the light emission duration.

According to some embodiments, the control circuit includes a counter. When the status signal is converted from the non-light emission status to the light emission status, the counter starts to count the light emission duration. When the status signal is converted from the light emission status to the non-light emission status, the counter stops counting the light emission duration.

According to some embodiments, the control circuit includes an interrupt circuit and a processor. The interrupt circuit receives the status signal. When the status signal is converted from the non-light emission status to the light emission status, the interrupt circuit generates a light emission interrupt signal. When the status signal is converted from the light emission status to the non-light emission status, the interrupt circuit generates a non-light emission interrupt signal. The processor starts to accumulate the light emission duration according to the light emission interrupt signal and stops accumulating the light emission duration according to the non-light emission interrupt signal. When the light emission duration is greater than the preset value, the processor stops the optical transceiver circuit from outputting the optical signal.

According to some embodiments, when the status signal is converted from the non-light emission status to the light emission status, the control circuit starts to accumulate the light emission duration. When the light emission duration is greater than the preset value, the control circuit stops the optical transceiver circuit from outputting the optical signal and stops accumulating the light emission duration.

According to some embodiments, the counter performs counting according to a clock frequency of the control circuit.

According to some embodiments, when the light emission duration is greater than the preset value, the control circuit outputs a termination signal. The optical transceiver circuit stops outputting the optical signal according to the termination signal.

Therefore, according to some embodiments, when the optical transceiver circuit outputs the status signal according to whether or not the optical transceiver circuit outputs the optical signal, the control circuit accumulates the light emission duration according to the status signal. When the light emission duration is greater than the preset value, it is indicated that the optical network device emits light within the time when it should not emit light. That is, the optical network device is in an abnormal light emission status, and the control circuit stops the optical transceiver circuit from outputting the optical signal, so as to cause the optical network device to stop interfering with other optical network devices and reduce the influence on the transmission operation of the entire optical network.

DETAILED DESCRIPTION

Figure 1:
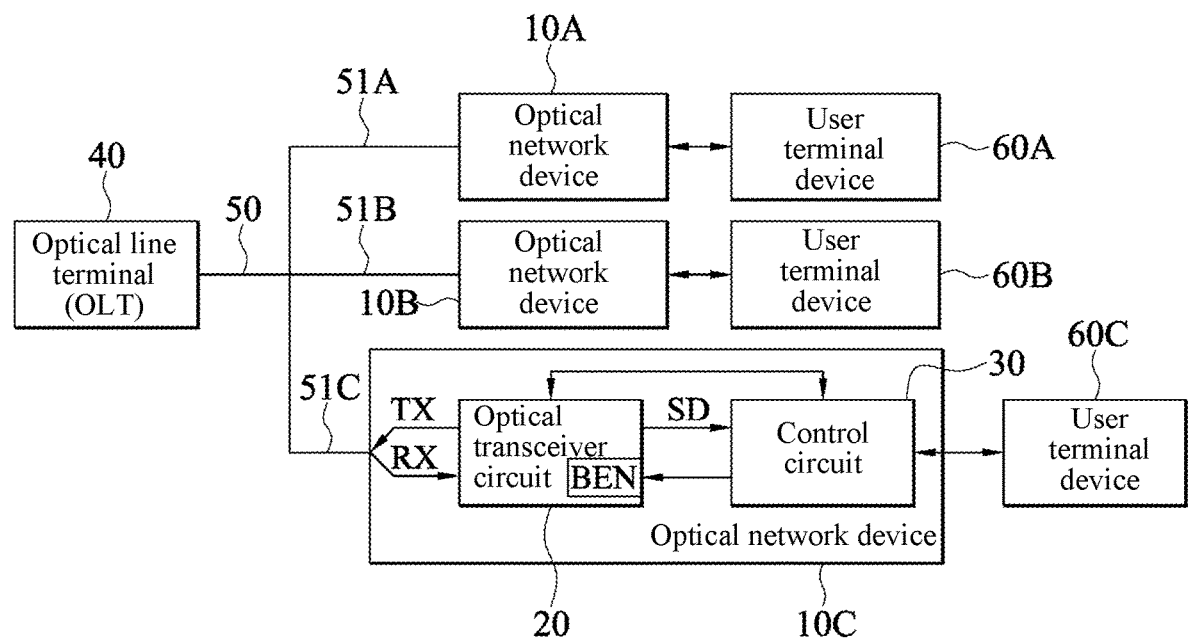
FIG. 1 illustrates a schematic block diagram of optical network devices with abnormal light emission detection according to some embodiments.

Referring to FIG. 1, FIG. 1 illustrates a schematic block diagram of optical network devices 10A to 10C with abnormal light emission detection according to some embodiments. An optics line terminal 40 is connected to a main optical fiber 50, and the plurality of optical network devices 10A to 10C are respectively connected to corresponding sub-optical fibers 51A to 51C. In some embodiments, the main optical fiber 50 and the plurality of sub-optical fibers 51A to 51C area one-to-multiple optical coupler, or an optical splitter, or an optical combiner. The optics line terminal 40 is connected to the plurality of optical network devices 10A to 10C via the main optical fiber 50, so as to achieve point (the optics line terminal 40)-to-multipoint (the optical network devices 10A to 10C) communication transmission. The optics line terminal 40 is configured to transmit a transmission signal RX to the plurality of optical network devices 10A to 10C to allocate a time slot where each of the optical network devices 10A to 10C may emit light. The optical network devices 10A to 10C receive the transmission signal RX to obtain the time slots where light may be emitted. The transmission signal RX is an authorization signal for the optics line terminal 40 to authorize the plurality of optical network devices 10A to 10C to emit light in the time slot where light may be emitted hereby.

Each of the optical network devices 10A to 10C includes an optical transceiver circuit 20 and a control circuit 30. The optical transceiver circuit 20 receives the transmission signal RX. The control circuit 30 acquires a time slot wherein optical signal TX may be outputted according to the transmission signal RX, and enables the optical transceiver circuit 20, so that the optical transceiver circuit 20 outputs the optical signal TX in the time slot where the optical signal TX may be outputted. The optical transceiver circuit 20 outputs a status signal SD according to whether or not the optical transceiver circuit 20 is outputting the optical signal TX, and the control circuit 30 accumulates a light emission duration according to the status signal SD. When the light emission duration is greater than a preset value, the control circuit 30 stops the optical transceiver circuit 20 from outputting the optical signal TX. The light emission duration is a duration that the optical transceiver circuit 20 constantly outputs the optical signal TX hereby. In some embodiments, the optical transceiver circuit 20 outputs the optical signal TX to the optics line terminal 40.

When communication transmission is uplink transmission, there is only one channel for transmitting signals from the optical network devices 10A to 10C to the optics line terminal 40. When one of the optical network devices 10A to 10C emits light in a non-allocated time slot of the optics line terminal 40, it will affect the communication transmission of other optical network devices 10A to 10C. Therefore, if the light emission duration that the optical transceiver circuit 20 constantly outputs the optical signal TX is greater than the preset value, the control circuit 30 stops the optical transceiver circuit 20 from outputting the optical signal TX. In this way, the influence of the optical network devices 10A to 10C that abnormally emit light on the communication transmission of an entire passive optical network may be reduced.

In some embodiments, the control circuit 30 of the optical network devices 10A to 10C receives a data signal from corresponding user terminal devices 60A to 60C, and the control circuit 30 converts the data signal into the optical signal TX in the time slot where light may be emitted and outputs the optical signal to the optics line terminal 40. Conversely, the optical transceiver circuit 20 of the optical network devices 10A to 10 C receives the data signal from the optics line terminal 40 and converts the data signal into an electrical data signal. The control circuit 30 analyzes the data signal and determines whether the data signal belongs to its own data signal. When the data signal belongs to its own data signal, the data signal is transmitted to the corresponding user terminal devices 60A to 60D. In some embodiments, the data signal transmitted by the optics line terminal 40 includes the foregoing transmission signal. Therefore, when the data signal is analyzed, the control circuit 30 can obtain the time slot where the optical signal TX may be outputted. In some embodiments, the optical network devices 10A to 10C are connected to the user terminal devices 60A to 60C via cables, twisted wires, and the like.

The foregoing optics line terminal 40 is, for example, but not limited to, a terminal device of an optical fiber, an optical transceiver, and the like. The foregoing user terminal devices 60A to 60C are, for example, but not limited to, media converters, mobile devices, computers, servers, and the like.

The foregoing optical transceiver circuit 20 is, for example, but not limited to, a small form pluggable (SFP) optical transceiver module, a 10 gigabit small form pluggable (XFP) optical transceiver module, a gigabit rate interface converter optical transceiver module, and the like. In some embodiments, the optical transceiver circuit 20 includes a photo diode, a laser device, a circuit for receiving a photo diode electrical signal, and a circuit for driving or controlling the laser device. The circuit for receiving the photo diode electrical signal and the circuit for driving or controlling the laser device may be a single chip or multiple chips. The laser device may be a light emitting diode, a liquid laser, a solid laser, a gas laser, and the like.

The foregoing control circuit 30 is, for example, but not limited to, a central processing unit (CPU), a microprocessor, an application-specific integrated circuit (ASIC), a system-on-chip (SOC), and the like. In some embodiments, the control circuit 30 may be electrically connected to the optical transceiver circuit 20 via a bus. In some embodiments, the optical transceiver circuit 20 receives the transmission signal RX from the optics line terminal 40 and transmits the transmission signal RX to the control circuit 30 via the bus.

In some embodiments, the control circuit 30 transmits an enable signal to the enable end BEN of the optical transceiver circuit 20 according to the transmission signal RX to enable the optical transceiver circuit 20, and the optical transceiver circuit 20 outputs the optical signal TX when enabled. For example, after receiving the enable signal, the enable end BEN triggers a burst mode of the optical transceiver circuit 20 to enable the optical transceiver circuit 20 and output the optical signal TX. In some embodiments, the enable signal is a level signal. For example, when the level signal is at a high level, it indicates enable. When the level signal is at a low level, it indicates not enable (also referred to as disable). However, it is not limited to this. For example, when the level signal is at the low level, it indicates enable; and when the level signal is at the high level, it indicates disable.

In some embodiments, the optical transceiver circuit 20 outputs the status signal SD according to whether or not the optical transceiver circuit outputs the optical signal TX. For example, when the optical transceiver circuit 20 outputs the optical signal TX, the status signal SD is in a "light emission status", and when the optical transceiver circuit 20 does not output the optical signal TX, the status signal SD is in a "non-light emission status". In some embodiments, the status signal SD is a level signal. For example, when the level signal is at a high level, it indicates the light emission status; and when the level signal is at a low level, it indicates the non-light emission status. However, it is not limited to this. For example, when the level signal is at the low level, it indicates the light emission status; and when the level signal is at the high level, it indicates the non-light emission status. In some embodiments, the high level represents 1 of a binary bit, and the low level represents 0 of the binary bit. However, it is not limited to this. For example, the low level represents 0 of the binary bit, and the high level represents 1 of the binary bit.

In some embodiments, when the light emission duration is greater than the preset value, the control circuit 30 stops the optical transceiver circuit 20 from outputting the optical signal TX, which means that the control circuit 30 transmits a disable signal to the optical transceiver circuit 20 (i.e., the control circuit 30 changes the enable end BEN connected to the optical transceiver circuit 20 to be disabled), and the optical transceiver circuit 20 stops transmitting the optical signal TX when there is no enable signal (or a disable signal is received). For example, the control circuit 30 includes a comparator and a storage device. The storage device stores the preset value. The control circuit 30 accumulates the light emission duration, and uses the comparator to compare the light emission duration with the preset value. If the light emission duration is greater than the preset value, the control circuit 30 stops the optical transceiver circuit 20 from outputting the optical signal TX.

Figure 3:
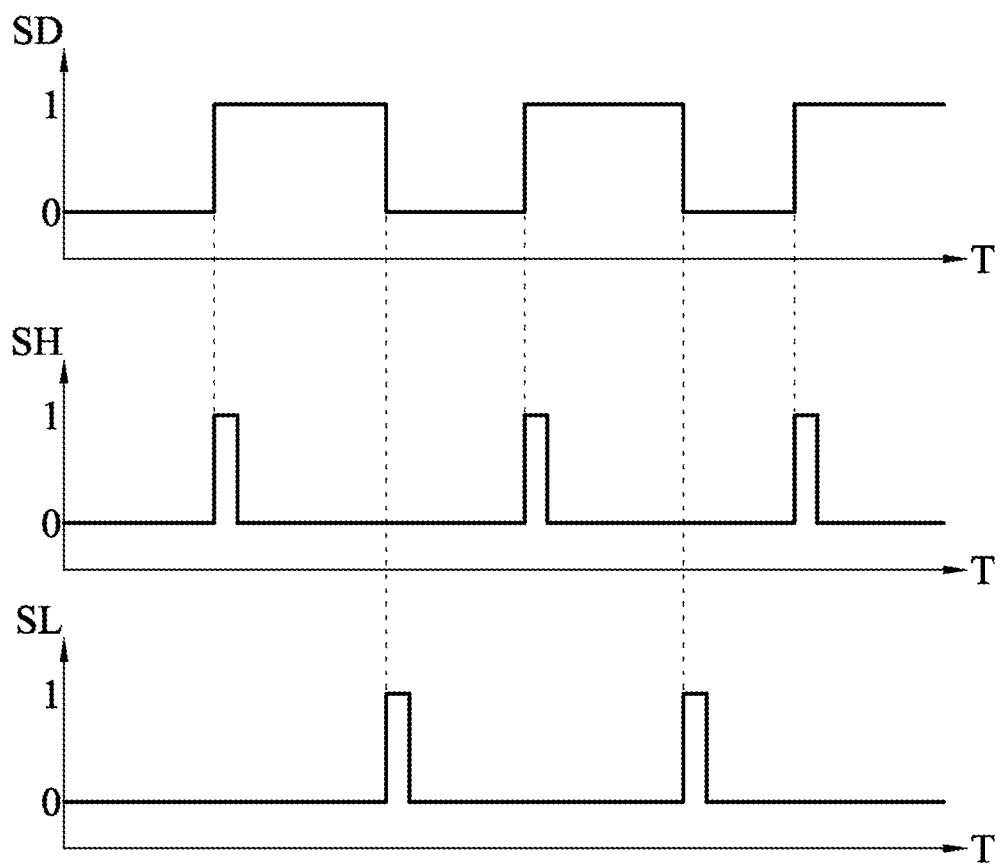
FIG. 3 illustrates a schematic diagram of a status signal and an interrupt signal according to some embodiments.

In some embodiments, when the status signal SD (as shown in FIG. 3) is converted from the non-light emission status to the light emission status, the control circuit 30 starts to accumulate the light emission duration. When the status signal is converted from the light emission status to the non-light emission status, the control circuit 30 stops accumulating the light emission duration. For example, when the status signal SD is converted from the low level to the high level, the control circuit 30 starts to accumulate the time (light emission duration) when the optical transceiver circuit 20 outputs the optical signal TX. When the status signal SD is converted from the high level into the low level, the control circuit 30 stops accumulating the time (light emission duration) when the optical transceiver circuit 20 outputs the optical signal TX. Therefore, the control circuit 30 obtains the foregoing light emission duration. Next, the control circuit 30 compares the light emission duration with the preset value, and determines whether to stop the optical transceiver circuit 20 from outputting the optical signal.

In some embodiments, when the status signal SD is converted from the high level to the low level, the control circuit 30 starts to accumulate the light emission duration. When the status signal SD is converted from the low level to the high level, the control circuit 30 stops accumulating the light emission duration.

In some embodiments, when the status signal SD is converted from the low level to the high level, the control circuit 30 triggers a preset rising edge action. When the status signal SD is converted from the high level to the low level, the control circuit 30 triggers a preset falling edge action. The rising edge action is that the control circuit 30 starts to accumulate the time (the light emission duration) when the optical transceiver circuit 20 outputs the optical signal TX, and the falling edge action is that the control circuit 30 stops accumulating the time (the light emission duration) when the optical transceiver circuit 20 outputs the optical signal TX hereby. However, it is not limited to this. For example, the rising edge action is that the control circuit 30 stops accumulating the time (the light emission duration) when the optical transceiver circuit 20 outputs the optical signal TX, and the falling edge action is that the control circuit 30 starts to accumulate the time (the light emission duration) when the optical transceiver circuit 20 outputs the optical signal TX.

Figure 2:
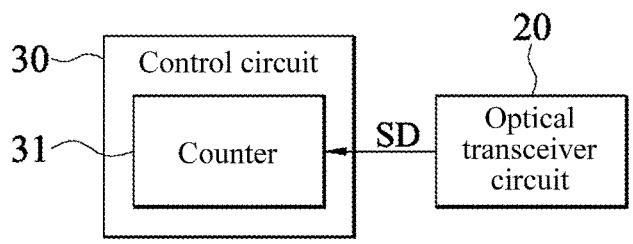
FIG. 2 illustrates a schematic block diagram of a control circuit according to some embodiments.

Referring to the status signal SD of FIG. 2 and FIG. 3, FIG. 2 illustrates a schematic block diagram of control circuit 30 according to some embodiments. In some embodiments, the control circuit 30 includes a counter 31. When the status signal SD is converted from the non-light emission status to the light emission status, the counter 31 starts to count the light emission duration. When the status signal SD is converted from the light emission status to the non-light emission status, the counter 31 stops counting the light emission duration. For example, when the status signal SD is converted from the low level to the high level, the counter 31 starts to count the time (light emission duration) that the optical transceiver circuit 20 outputs the optical signal TX, that is, the counter 31 performs counting once progressively at intervals. When the status signal SD is converted from the high level into the low level, the counter 31 stops counting the time (light emission duration) that the optical transceiver circuit 20 outputs the optical signal TX, that is, the counter 31 no longer performs the counting progressively. In some embodiments, the unit of the light emission duration may be number of times. In some embodiments, the counter 31 performs counting according to a clock frequency CLK of the control circuit 30, so that the unit of the light emission duration is number of clocks.

In some embodiments, when the status signal SD is converted from the high level to the low level, the counter 31 starts to count the light emission duration. When the status signal SD is converted from the low level to the high level, the counter 31 stops counting the light emission duration.

In some embodiments, when the status signal SD is converted from the low level to the high level, the control circuit 30 triggers a preset rising edge action. When the status signal SD is converted from the high level to the low level, the control circuit 30 triggers a preset falling edge action. The rising edge action is that the counter 31 starts to count the time (the light emission duration) when the optical transceiver circuit 20 outputs the optical signal TX, and the falling edge action is that the counter 31 stops counting the time (the light emission duration) that the optical transceiver circuit 20 outputs the optical signal TX. However, it is not limited to this. For example, the rising edge action is that the counter 31 stops counting the time (the light emission duration) that the optical transceiver circuit 20 outputs the optical signal TX, and the falling edge action is that the counter 31 starts to count the time (the light emission duration) when the optical transceiver circuit 20 outputs the optical signal TX. In some embodiments, when the status signal SD is converted from the low level to the high level, the counter 31 may trigger a preset rising edge action. When the status signal SD is converted from the high level to the low level, the counter 31 may trigger a preset falling edge action.

The unit of the foregoing preset value is consistent with the unit of the light emission duration. In some embodiments, the unit of the light emission duration is microsecond (the unit of time), and the unit of the preset value is microsecond. In some embodiments, the unit of the light emission duration is number of clocks, and the unit of the preset value is number of clocks.

The foregoing preset value may be set according to a unit time slot length of the uplink transmission of the passive optical network. A light emission transmission criterion (such as a communication protocol G.984.3) of the optical network devices 10A to 10C is taken as an example. This criterion specifies a time length of a time slot of the uplink transmission of a single optical network device. The foregoing preset value may be set to be greater than or equal to the time length of this time slot. If the number of clocks is used as the unit of the preset value, the preset value may be the number of clocks obtained by dividing the time length of the time slot by the time length of the clock frequency CLK (an unconditional carry method may be used). In some embodiments, the preset value may be customized by a user. In some embodiments, the preset value may be stored in the storage device. The storage device may be disposed in the control circuit 30, the optical network devices 10A to 10C, or an externally connected device.

Figure 4:
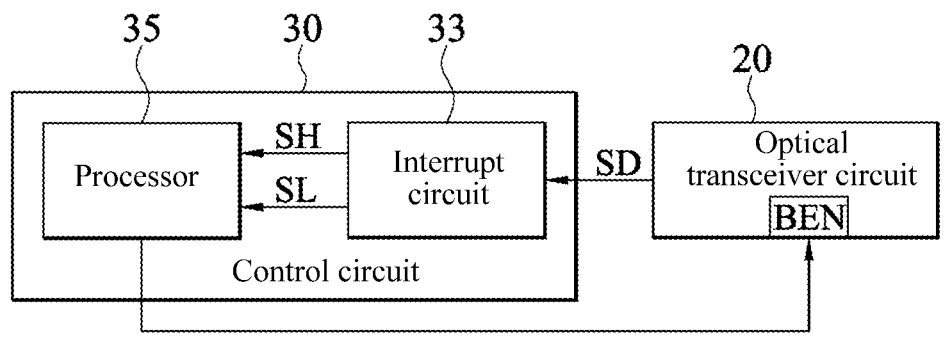
FIG. 4 illustrates a schematic block diagram of a control circuit according to some embodiments.

Referring to FIG. 3 and FIG. 4, FIG. 3 illustrates a schematic diagram of a status signal SD and an interrupt signal according to some embodiments. FIG. 4 illustrates a schematic block diagram of a control circuit 30 according to some embodiments. Control circuit 30 includes an interrupt circuit 33 and a processor 35. The interrupt circuit 33 receives the status signal SD. When the status signal SD is converted from a non-light emission status to a light emission status, the interrupt circuit 33 generates a light emission interrupt signal SH. When the status signal SD is converted from the light emission status to the non-light emission status, the interrupt circuit 33 generates a non-light emission interrupt signal SL. The processor 35 starts to accumulate the light emission duration according to the light emission interrupt signal SH and stops accumulating the light emission duration according to the non-light emission interrupt signal SL. When the light emission duration is greater than a preset value, the processor 35 stops the optical transceiver circuit 20 from outputting an optical signal TX. For example, when the status signal SD is converted from a low level into a high level, the interrupt circuit 33 initiates a rising edge trigger action and generates the light emission interrupt signal SH. When the status signal SD is converted from the high level to the low level, the interrupt circuit 33 initiates a falling edge trigger action and generates the non-light emission interrupt signal SL. The processor 35 initiates an interrupt service program according to the light emission interrupt signal SH and starts to accumulate the light emission duration. The processor 35 initiates the interrupt service program according to the non-light emission interrupt signal SL and stops accumulating the light emission duration. The processor 35 stops the optical transceiver circuit 20 from outputting the optical signal TX, which means that the processor 35 transmits a disable signal to the optical transceiver circuit 20 (i.e., the processor 35 changes the enable end BEN connected to the optical transceiver circuit 20 to be disabled), and the optical transceiver circuit 20 stops transmitting the optical signal TX when there is no enable signal (or a disable signal is received) hereby.

In some embodiments, the interrupt service program of the processor 35 may determine whether the received interrupt signal is the light emission interrupt signal SH or the non-light emission interrupt signal SL to perform a corresponding action. In some embodiments, since the light emission status may be at the low level and the non-light emission status may be at the high level, the light emission interrupt signal SH may be generated by initiation of the falling edge trigger action by the interrupt circuit 33, and the non-light emission interrupt signal SL may be generated by initiation of the rising edge trigger action by the interrupt circuit 33.

In some embodiments, the interrupt circuit 33 is, for example, but not limited to, a general purpose input output (GPIO) interrupt circuit, and the like. In some embodiments, output pins of the interrupt signals may be the same pin. For example, the pin that outputs light emission interrupt signal SH and the pin that outputs non-light emission interrupt signal SL are the same.

In some embodiments, when the status signal SD is converted from the non-light emission status to the light emission status, the control circuit 30 starts to accumulate the light emission duration. When the light emission duration is greater than the preset value, the control circuit 30 stops the optical transceiver circuit 20 from outputting the optical signal TX and stops accumulating the light emission duration. For example, the control circuit 30 includes a comparator and a storage device. The storage device stores the preset value. The control circuit 30 accumulates the light emission duration, and uses the comparator to compare the light emission duration with the preset value. If the light emission duration is greater than the preset value, the control circuit 30 stops the optical transceiver circuit 20 from outputting the optical signal TX and stops accumulating the light emission duration. Since the operation mode of starting to accumulate the light emission duration has been described above, descriptions thereof are omitted here.

In some embodiments, the control circuit 30 includes a counter 31. When the status signal SD is converted from the non-light emission status to the light emission status, the counter 31 starts to count the light emission duration. When the light emission duration is greater than the preset value, the control circuit 30 stops the optical transceiver circuit 20 from outputting the optical signal, and the counter 31 stops counting the light emission duration. For example, the control circuit 30 includes a comparator, a counter, and a storage device. The storage device stores the preset value. The counter 31 counts the light emission duration, and uses the comparator to compare the light emission duration with the preset value. If the light emission duration is greater than the preset value, the control circuit 30 stops the optical transceiver circuit 20 from outputting the optical signal TX, and the counter 31 stops performing the counting. Since the operation mode of starting to count the light emission duration has been described above, descriptions thereof are omitted here.

Figure 5:
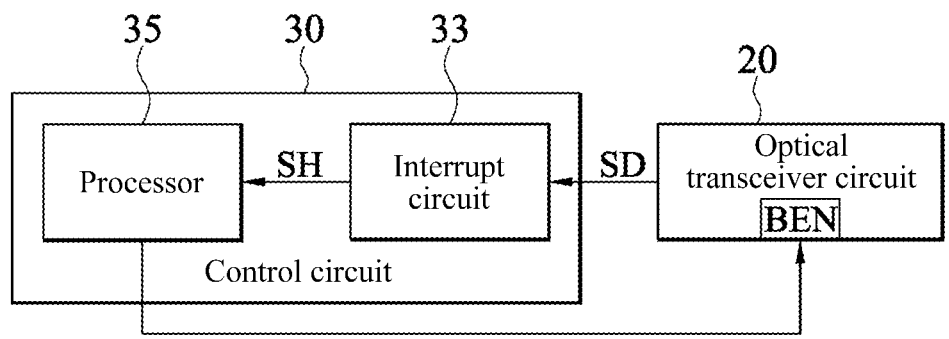
FIG. 5 illustrates a schematic block diagram of a control circuit according to some embodiments.

Referring to FIG. 3 and FIG. 5, FIG. 5 illustrates a schematic block diagram of a control circuit 30 according to some embodiments. In some embodiments, the control circuit 30 includes an interrupt circuit 33 and a processor 35. The interrupt circuit 33 receives the status signal SD. When the status signal SD is converted from a non-light emission status to a light emission status, the interrupt circuit 33 generates a light emission interrupt signal SH. The processor 35 starts to accumulate the light emission duration according to the light emission interrupt signal SH. When the light emission duration is greater than the preset value, the processor 35 stops the optical transceiver circuit 20 from outputting the optical signal TX and stops accumulating the light emission duration. For example, when the status signal SD is converted from a low level to a high level, the interrupt circuit 33 initiates a rising edge trigger action and generates the light emission interrupt signal SH. The processor 35 initiates an interrupt service program according to the light emission interrupt signal SH and starts to accumulate the light emission duration. When the light emission duration is greater than the preset value, the processor 35 stops the optical transceiver circuit 20 from outputting the light signal TX and stops accumulating the light emission duration.

Figure 6:
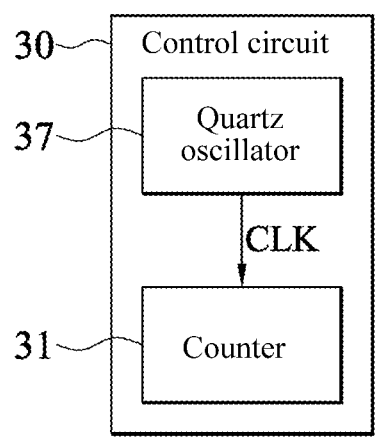
FIG. 6 illustrates a schematic block diagram of a control circuit according to some embodiments.

Referring to FIG. 6, FIG. 6 illustrates a schematic block diagram of a control circuit 30 according to some embodiments. In some embodiments, the counter 31 performs counting according to a clock frequency of the control circuit 30. For example, the control circuit 30 includes a quartz oscillator 37 and a counter 31. The counter 31 receives a clock frequency CLK of the quartz oscillator 37 and performs counting according to the period of the clock frequency CLK. For example, the counter 31 performs counting once after each period.

In some embodiments, when the light emission duration is greater than the preset value, the control circuit 30 outputs a termination signal, and the optical transceiver circuit 20 stops outputting the optical signal TX according to the termination signal. For example, the control circuit 30 includes a comparator and a storage device. The control circuit 30 is electrically connected to the optical transceiver circuit 20 via a bus. The storage device stores the preset value. The comparator receives the light emission duration and compares whether the light emission duration is greater than the preset value. If the light emission duration is greater than the preset value, the control circuit 30 outputs the termination signal to the optical transceiver circuit 20 via the bus, and the optical transceiver circuit 20 stops outputting the optical signal TX according to the termination signal. In some embodiments, the optical transceiver circuit 20 may stop outputting the optical signal TX by cutting off a power supply for its operation according to a termination signal.

Figure 7:
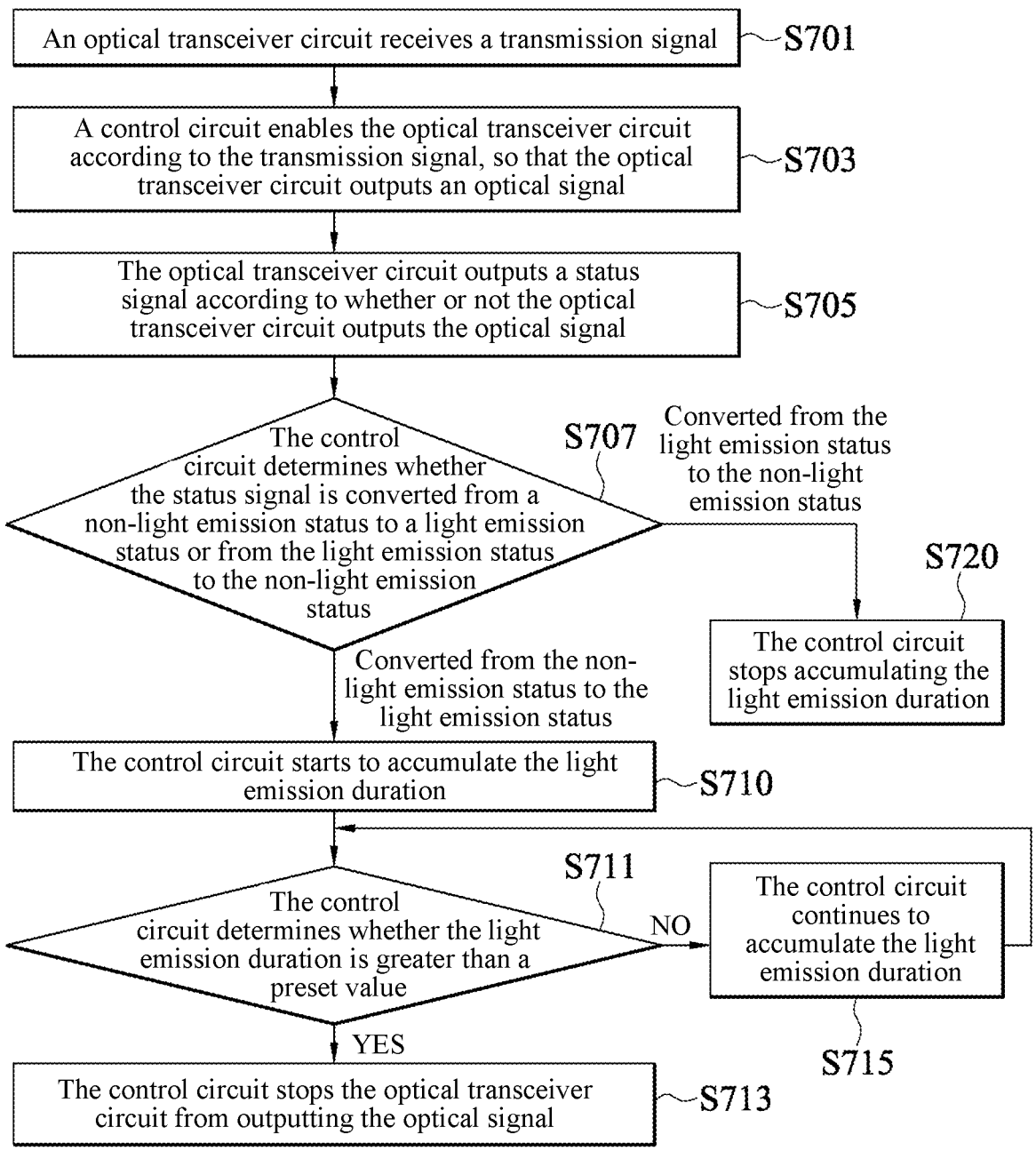
FIG. 7 illustrates a flow diagram of detecting abnormal light emission by optical network devices according to some embodiments.

Referring to FIG. 7, FIG. 7 illustrates a flow diagram of detecting abnormal light emission by optical network devices 10A to 10C according to some embodiments. Firstly, an optical transceiver circuit 20 receives a transmission signal RX from an optical line terminal 40 (step S701), so that the optical network devices 10A to 10C obtain a time slot where an optical signal TX may be outputted. Then step S703 is performed.

At step S703, a control circuit 30 enables the optical transceiver circuit 20 according to the transmission signal RX, so that the optical transceiver circuit 20 outputs the optical signal TX. For example, the control circuit 30 obtains the time slot where the optical signal TX may be outputted according to the transmission signal RX, and enables the optical transceiver circuit 20 in the time slot where the optical signal TX be outputted, so that the optical transceiver circuit 20 outputs the optical signal TX. Then step S705 is performed.

At step S705, the optical transceiver circuit 20 outputs a status signal SD according to whether or not the optical transceiver circuit outputs the optical signal TX. The status signal SD has been described above, and descriptions thereof are omitted. Then step S707 is performed.

At step S707, the control circuit 30 determines whether the status signal SD is converted from a non-light emission status to a light emission status or from the light emission status to the non-light emission status. If the status signal SD is converted from the non-light emission status to the light emission status, step S710 is performed. If the status signal SD is converted from the light emission status to the non-light emission status, step S720 is performed.

At step S710, the control circuit 30 starts to accumulate the light emission duration. The light emission duration is a duration that the optical transceiver circuit 20 constantly outputs the optical signal TX. Then step S711 is performed.

At step S711, the control circuit 30 determines whether the light emission duration is greater than a preset value, and if the light emission duration is greater than the preset value, step S713 is performed, that is, the control circuit 30 stops the optical transceiver circuit 20 from outputting the optical signal TX. If the light emission duration is not greater than the preset value (meaning less than or equal to the preset value), step S715 is performed, that is, the control circuit 30 continues to accumulate the light emission duration. Then step S711 is performed, and the subsequent steps are repeated.

At step S720, the control circuit 30 stops accumulating the lighting time duration.

Figure 8:
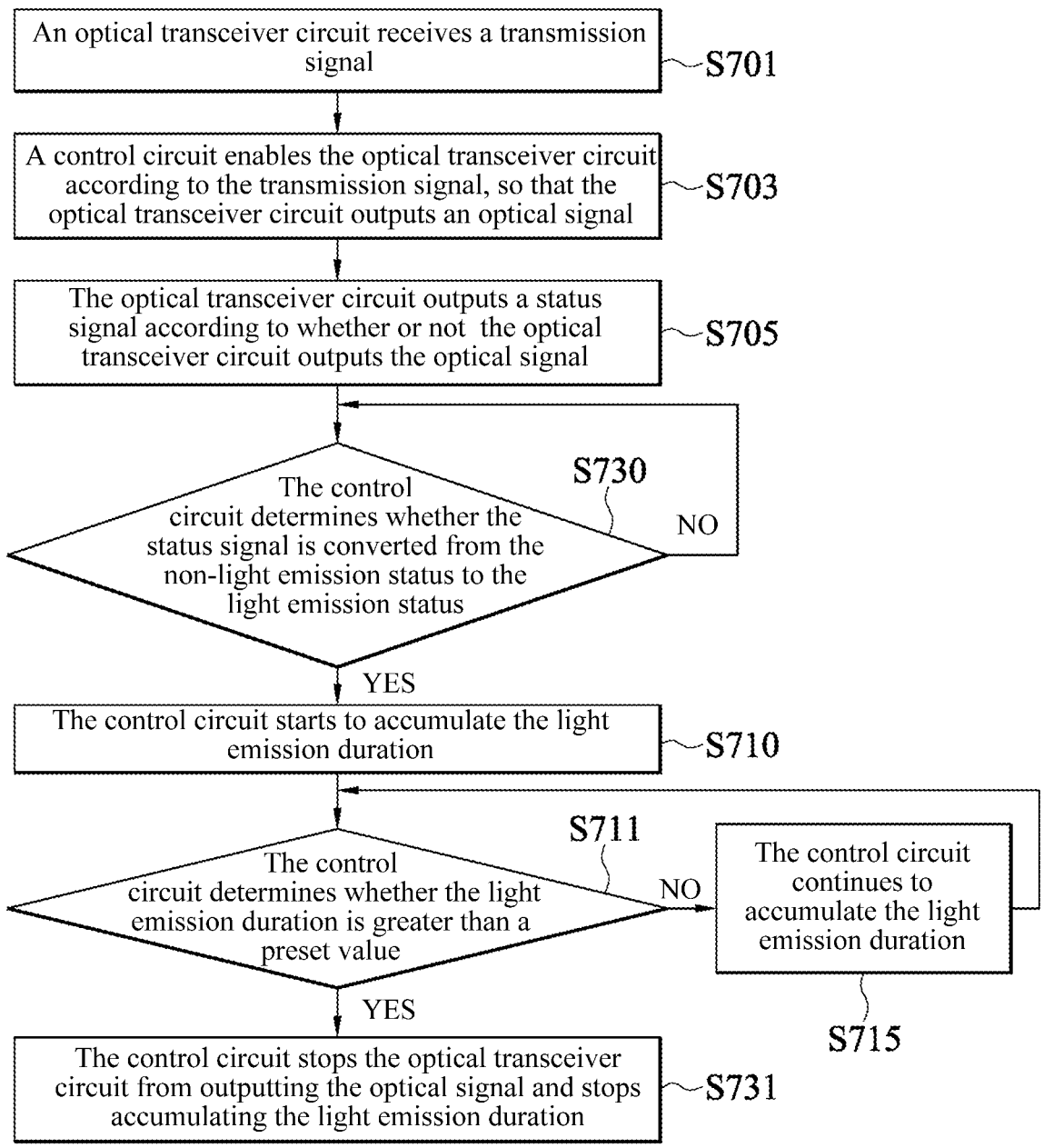
FIG. 8 illustrates a flow diagram of detecting abnormal light emission by optical network devices according to some embodiments.

Referring to FIG. 8, FIG. 8 illustrates a flow diagram of detecting abnormal light emission by optical network devices 10A to 10C according to some embodiments. After step S705 is performed, step S730 is performed. At step S730, control circuit 30 determines whether status signal SD is converted from a non-light emission status to a light emission status. If the status signal SD is converted from the non-light emission status to the light emission status, step S710 is performed. After step S710 is performed, step S711 is performed.

At step S711, the control circuit 30 determines whether the light emission duration is greater than preset value, and if the light emission duration is greater than the preset value, step S731 is performed, that is, the control circuit 30 stops the optical transceiver circuit 20 from outputting the optical signal TX and stops accumulating the light emission duration. If the light emission duration is not greater than the preset value (meaning less than or equal to the preset value), step S715 is performed, and the subsequent steps are repeated. Since steps S701 to S705, S710 and S715 have been described above, descriptions thereof are omitted.

Therefore, according to some embodiments, when the optical transceiver circuit outputs the status signal according to whether or not the optical transceiver circuit outputs the optical signal, the control circuit accumulates the light emission duration according to the status signal. When the light emission duration is greater than the preset value, it is indicated that the optical network device emits light within the time when it should not emit light. That is, the optical network device is in an abnormal light emission status, and the control circuit stops the optical transceiver circuit from outputting the optical signal, so as to cause the optical network device to stop interfering with other optical network devices and reduce the influence on the transmission operation of the entire optical network.

What is claimed is:

1. An optical network device with abnormal light emission detection, comprising:
   an optical transceiver circuit receiving a transmission signal; and
   a control circuit enabling the optical transceiver circuit according to the transmission signal, so that the optical transceiver circuit outputs an optical signal, wherein the optical transceiver circuit outputs a status signal according to whether or not the optical transceiver circuit outputs the optical signal, the control circuit accumulates a light emission duration according to the status signal, and when the light emission duration is greater than a preset value, the control circuit stops the optical transceiver circuit from outputting the optical signal, wherein when the status signal is converted from a non-light emission status to a light emission status, the control circuit starts to accumulate the light emission duration; and when the status signal is converted from the light emission status to the non-light emission status, the control circuit stops accumulating the light emission duration.

2. The optical network device with abnormal light emission detection according to claim 1, wherein the control circuit comprises a counter; when the status signal is converted from the non-light emission status to the light emission status, the counter starts to count the light emission duration; and when the status signal is converted from the light emission status to the non-light emission status, the counter stops counting the light emission duration.

3. The optical network device with abnormal light emission detection according to claim 2, wherein the counter performs counting according to a clock frequency of the control circuit.

4. The optical network device with abnormal light emission detection according to claim 1, wherein when the light emission duration is greater than the preset value, the control circuit disables the optical transceiver circuit, so that the optical transceiver circuit stops outputting the optical signal.

5. The optical network device with abnormal light emission detection according to claim 1, wherein when the light emission duration is greater than the preset value, the control circuit outputs a termination signal, and the optical transceiver circuit stops outputting the optical signal according to the termination signal.

6. The optical network device with abnormal light emission detection according to claim 1, wherein the control circuit comprises:
an interrupt circuit receiving the status signal, wherein when the status signal is converted from the non-light emission status to the light emission status, the interrupt circuit generates a light emission interrupt signal; and when the status signal is converted from the light emission status to the non-light emission status, the interrupt circuit generates a non-light emission interrupt signal; and
a processor starting to accumulate the light emission duration according to the light emission interrupt signal and stopping accumulating the light emission duration according to the non-light emission interrupt signal, wherein when the light emission duration is greater than the preset value, the processor stops the optical transceiver circuit from outputting the optical signal.

7. The optical network device with abnormal light emission detection according to claim 6, wherein when the light emission duration is greater than the preset value, the control circuit disables the optical transceiver circuit, so that the optical transceiver circuit stops outputting the optical signal.

8. The optical network device with abnormal light emission detection according to claim 6, wherein when the light emission duration is greater than the preset value, the control circuit outputs a termination signal, and the optical transceiver circuit stops outputting the optical signal according to the termination signal.

9. The optical network device with abnormal light emission detection according to claim 1, wherein when the status signal is converted from the non-light emission status to the light emission status, the control circuit starts to accumulate the light emission duration; and when the light emission duration is greater than the preset value, the control circuit stops the optical transceiver circuit from outputting the optical signal and stops accumulating the light emission duration.

10. The optical network device with abnormal light emission detection according to claim 9, wherein when the light emission duration is greater than the preset value, the control circuit disables the optical transceiver circuit, so that the optical transceiver circuit stops outputting the optical signal.

11. The optical network device with abnormal light emission detection according to claim 9, wherein when the light emission duration is greater than the preset value, the control circuit outputs a termination signal, and the optical transceiver circuit stops outputting the optical signal according to the termination signal.

12. The optical network device with abnormal light emission detection according to claim 9, wherein the control circuit comprises a counter; when the status signal is converted from the non-light emission status to the light emission status, the counter starts to count the light emission duration; and when the light emission duration is greater than the preset value, the control circuit stops the optical transceiver circuit from outputting the optical signal, and the counter stops counting the light emission duration.

13. The optical network device with abnormal light emission detection according to claim 12, wherein the counter performs counting according to a clock frequency of the control circuit.

14. The optical network device with abnormal light emission detection according to claim 12, wherein when the light emission duration is greater than the preset value, the control circuit outputs a termination signal, and the optical transceiver circuit stops outputting the optical signal according to the termination signal.

15. The optical network device with abnormal light emission detection according to claim 1, wherein the control circuit comprises:
an interrupt circuit receiving the status signal, wherein when the status signal is converted from the non-light emission status to the light emission status, the interrupt circuit generates a light emission interrupt signal; and
a processor starting to accumulate the light emission duration according to the light emission interrupt signal, wherein when the light emission duration is greater than the preset value, the processor stops the optical transceiver circuit from outputting the optical signal and stops accumulating the light emission duration.

16. The optical network device with abnormal light emission detection according to claim 15, wherein when the light emission duration is greater than the preset value, the control circuit disables the optical transceiver circuit, so that the optical transceiver circuit stops outputting the optical signal.

17. The optical network device with abnormal light emission detection according to claim 15, wherein when the light emission duration is greater than the preset value, the control circuit outputs a termination signal, and the optical transceiver circuit stops outputting the optical signal according to the termination signal.

18. The optical network device with abnormal light emission detection according to claim 1, wherein when the light emission duration is greater than the preset value, the control circuit disables the optical transceiver circuit, so that the optical transceiver circuit stops outputting the optical signal.

19. The optical network device with abnormal light emission detection according to claim 1, wherein when the light emission duration is greater than the preset value, the control circuit outputs a termination signal, and the optical transceiver circuit stops outputting the optical signal according to the termination signal.

* * * * *